(12) United States Patent
Sugiura et al.

(10) Patent No.: US 8,531,234 B2
(45) Date of Patent: Sep. 10, 2013

(54) TEMPERATURE DETECTION DEVICE

(75) Inventors: Masakazu Sugiura, Chiba (JP); Atsushi Igarashi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 57 days.

(21) Appl. No.: 13/236,043

(22) Filed: Sep. 19, 2011

(65) Prior Publication Data
US 2012/0105132 A1      May 3, 2012

(30) Foreign Application Priority Data

Oct. 28, 2010 (JP) ................................ 2010-242622
Mar. 13, 2011 (JP) ................................ 2011-054907

(51) Int. Cl.
*H03K 17/78*      (2006.01)

(52) U.S. Cl.
USPC ........................................................ 327/512

(58) Field of Classification Search
USPC .......................................... 327/512, 513, 539
See application file for complete search history.

(56) References Cited

U.S. PATENT DOCUMENTS

| | | | | |
|---|---|---|---|---|
| 5,801,982 A * | 9/1998 | Blodgett | .................. | 365/149 |
| 6,052,035 A * | 4/2000 | Nolan et al. | ................ | 331/74 |
| 6,078,208 A * | 6/2000 | Nolan et al. | ................ | 327/512 |
| 6,091,285 A * | 7/2000 | Fujiwara | .................. | 327/539 |
| 6,412,977 B1 * | 7/2002 | Black et al. | ................ | 374/178 |
| 6,630,859 B1 * | 10/2003 | Wang | .................. | 327/539 |
| 6,695,475 B2 * | 2/2004 | Yin | .................. | 374/171 |
| 6,853,258 B2 * | 2/2005 | Toliver et al. | ................ | 331/34 |
| 6,930,539 B2 * | 8/2005 | Erckert | .................. | 327/540 |
| 7,285,943 B2 * | 10/2007 | Migliavacca | ................ | 323/277 |
| 7,618,186 B2 * | 11/2009 | Kwon et al. | ................ | 374/170 |
| 7,637,658 B2 * | 12/2009 | Gardner et al. | ................ | 374/178 |
| 7,898,320 B2 * | 3/2011 | Ashburn et al. | ................ | 327/539 |
| 8,217,708 B2 * | 7/2012 | Yoshikawa | ................ | 327/513 |
| 2005/0185491 A1 * | 8/2005 | Kim et al. | ................ | 365/222 |
| 2007/0164809 A1 * | 7/2007 | Fukuda et al. | ................ | 327/539 |
| 2007/0182477 A1 * | 8/2007 | Kim | .................. | 327/539 |
| 2008/0084249 A1 * | 4/2008 | Noguchi | .................. | 331/66 |
| 2009/0096510 A1 * | 4/2009 | Ogiwara et al. | ................ | 327/539 |

FOREIGN PATENT DOCUMENTS

| | | |
|---|---|---|
| JP | 07-013643 A | 1/1995 |
| JP | 2003-108241 A | 4/2003 |

* cited by examiner

*Primary Examiner* — Thomas J Hiltunen
(74) *Attorney, Agent, or Firm* — Brinks Hofer Gilson & Lione

(57) ABSTRACT

Provided is a temperature detection device capable of attaining low current consumption at no expense of detection speed at around a temperature to be detected. The temperature detection device includes a control circuit for outputting a control signal for controlling ON/OFF of such internal circuits as a reference voltage circuit and a comparator. In the control circuit, in order to increase the detection speed at around the temperature to be detected, an oscillation frequency of an oscillation circuit has positive temperature characteristics. Further, the control circuit includes a waveform shaping circuit so as to optimize the waveform of the control signal for controlling ON of the internal circuits, to thereby attain low current consumption.

7 Claims, 5 Drawing Sheets

25 [°C]

80 [°C]

25 [°C]

80 [°C]

TEMPERATURE DETECTION DEVICE

RELATED APPLICATIONS

This application claims priority under 35 U.S.C. §119 to Japanese Patent Application Nos. 2010-242622 filed on Oct. 28, 2010 and 2011-054907 filed on Mar. 13, 2011, the entire contents of which are hereby incorporated by reference.

BACKGROUND OF THE INVENTION

1. Field of the Invention

The present invention relates to a temperature detection device for detecting temperature.

2. Description of the Related Art

In recent years, along with downsizing and higher circuit integration in mobile communication devices and the like, more devices are apt to generate much heat. A well-known example of means to protect circuits from such heat is overheat protection means for suspending the circuit operation when a predetermined temperature is detected (see, for example, Japanese Patent Application Laid-open No. Hei 7-13643).

A well-known example of a temperature detection device for detecting a predetermined temperature is the one in which an output of a temperature sensor for outputting a voltage corresponding to temperature and a reference voltage are compared and the magnitude relation therebetween is determined by a comparator (see, for example, Japanese Patent Application Laid-open No. 2003-108241).

FIG. 6 is a configuration diagram illustrating a conventional temperature detection device. The conventional temperature detection device includes a temperature sensor 601, a reference voltage circuit 602, and a comparator 603. A voltage of the reference voltage circuit 602 is constant with respect to temperature, and is set to a voltage that the temperature sensor 601 outputs at a temperature to be detected. The comparator 603 outputs the magnitude relation between a voltage of the temperature sensor 601 and the voltage of the reference voltage circuit 602. The temperature detection device is configured to indicate whether or not the temperature has reached the temperature to be detected based on the output of the comparator 603.

Mobile communication devices are required to operate with low consumption in order to extend the battery duration. It is therefore desired that current consumption of individual parts be smaller. In the conventional temperature detection device, however, an operating current flows all the time, and hence there is a problem that the current consumption of the temperature detection device increases.

SUMMARY OF THE INVENTION

The present invention has been devised for solving the above-mentioned problem, and realizes a temperature detection device capable of suppressing current consumption at no expense of required functions.

According to the present invention, there is provided a temperature detection device for detecting temperature, including: internal circuits including a temperature sensor for outputting a voltage corresponding to temperature, and a comparator for comparing and determining a magnitude relation between an output voltage of the temperature sensor and a reference voltage; and a control circuit, in which the control circuit outputs a control signal for controlling ON/OFF of the internal circuits based on the temperature.

According to the temperature detection device of the present invention, the temperature detection device can be operated without causing an operating current to flow through the internal circuits of the temperature detection device all the time. Therefore, a temperature detection device capable of attaining low current consumption at no expense of detection speed at around a temperature to be detected can be provided.

DETAILED DESCRIPTION OF THE PREFERRED EMBODIMENT

Figure 1:
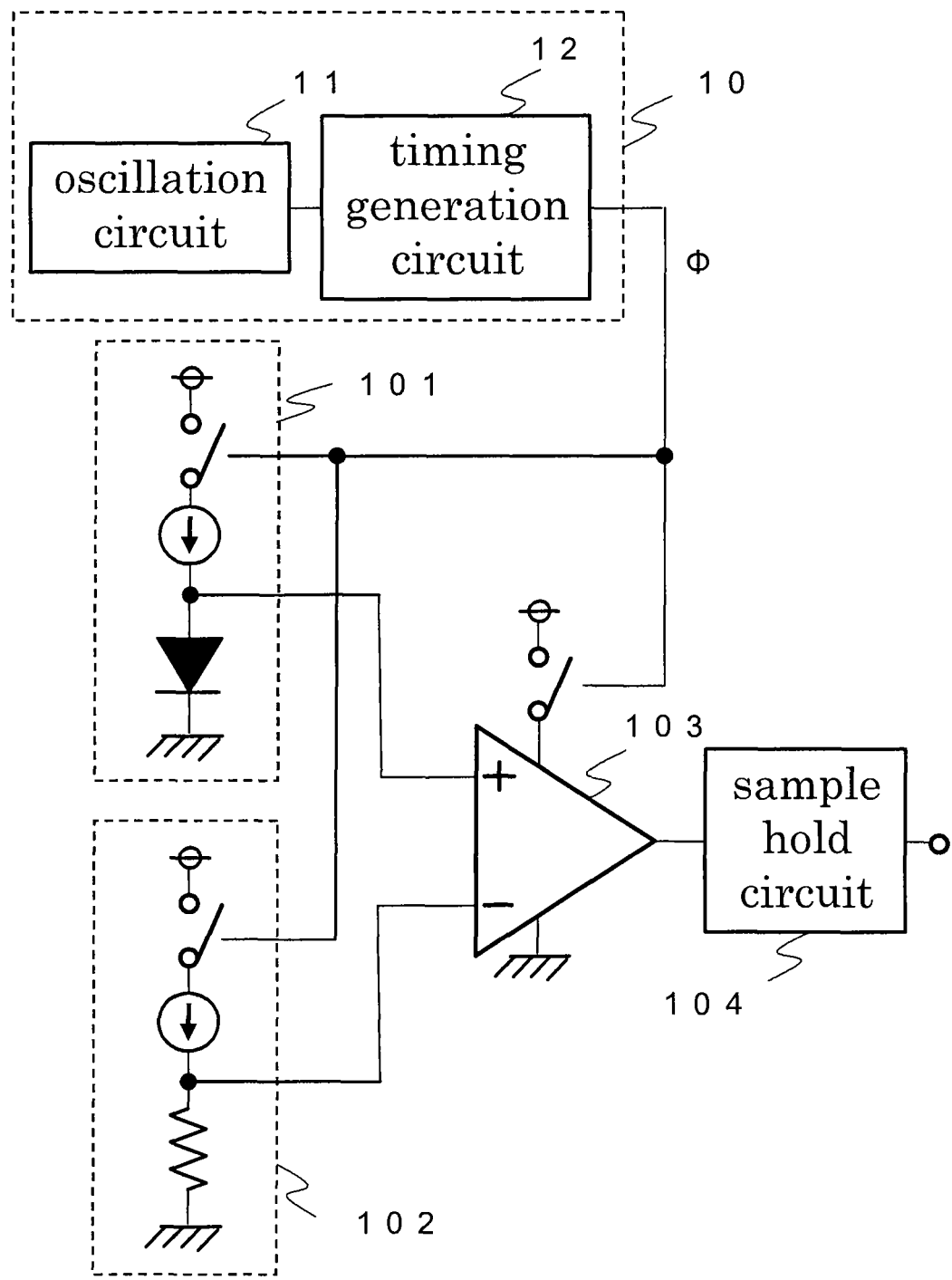
FIG. 1 is a circuit diagram illustrating a temperature detection device according to an embodiment of the present invention.

FIG. 1 is a configuration diagram illustrating a temperature detection device according to an embodiment of the present invention.

The temperature detection device according to this embodiment includes a temperature sensor 101, a reference voltage circuit 102, a comparator 103, a sample and hold circuit 104, and a control circuit 10 for controlling an intermittent operation. The control circuit 10 includes an oscillation circuit 11 and a timing generation circuit 12.

The temperature sensor 101 and the reference voltage circuit 102 are connected to input terminals of the comparator 103. The comparator 103 has an output terminal connected to an output terminal of the temperature detection device via the sample and hold circuit 104. The temperature sensor 101, the reference voltage circuit 102, and the comparator 103, which are internal circuits of the temperature detection device, each include a switch circuit connected to a power supply terminal, and the switch circuit is connected to an output terminal of the control circuit 10. The switch circuits are, for example, MOS switches.

A voltage of the reference voltage circuit 102 is set to a voltage that the temperature sensor 101 outputs at a temperature to be detected. The control circuit 10 outputs a control signal $\Phi$ for controlling the intermittent operation to the internal circuits of the temperature detection device.

Hereinafter, an operation of the temperature detection device according to this embodiment is described.

The oscillation circuit 11 included in the control circuit 10 outputs a reference clock. The timing generation circuit 12 included in the control circuit 10 receives the reference clock of the oscillation circuit 11 and outputs, at a predetermined frequency, the control signal $\Phi$ for controlling ON/OFF of the internal circuits.

When the control circuit 10 outputs the control signal $\Phi$ indicating an ON-controlled state (such as H level), the internal circuits enter an operating state. The comparator 103 compares an output of the temperature sensor 101 and the voltage of the reference voltage circuit 102 for the magnitude relation to determine whether or not the temperature detection device is in a temperature detected state. The comparator 103 then outputs a detection signal.

When the control circuit 10 outputs the control signal Φ indicating an OFF-controlled state (such as L level), the internal circuits are disconnected from the power supply terminal and enter a suspended state, to thereby save operating currents.

When the internal circuits of the temperature detection device are in the suspended state, the comparator 103 outputs an invalid detection signal. In this case, for example, the sample and hold circuit 104 provided to the output terminal of the comparator 103 may be used to sample and hold a valid output of the comparator 103 at any timing when the internal circuits are in the ON-controlled state.

With this configuration, in the OFF-controlled state, the determination result which is sampled and held in the last ON-controlled state can continue to be output at the above-mentioned predetermined frequency. In other words, as described above, the determination result as to whether the temperature detection device is in the temperature detected state can continue to be output as the output of the sample and hold circuit 104.

In this way, by carrying out appropriate sampling and holding on the output of the comparator 103, the invalid detection signal of the comparator 103, which is output in the OFF-controlled state, can be prevented from being output from the temperature detection device.

In the temperature detection device according to this embodiment, as described above, whether or not the temperature detection device is in the temperature detected state is not determined in the OFF-controlled state. Accordingly, the response time of the temperature detection device is dependent on the frequency of the oscillation circuit 11. The response time of the temperature detection device is improved in capability to follow a change in temperature as the frequency of the oscillation circuit 11 becomes higher. However, when the frequency of the oscillation circuit 11 is high, current consumption increases. In other words, there is a trade-off relationship between the response time of the temperature detection device and the current consumption.

In light of the above, in the temperature detection device according to this embodiment, positive temperature characteristics are imparted to the frequency of the oscillation circuit 11 so that the frequency is increased as the temperature rises to approach a temperature to be detected.

Figure 2:
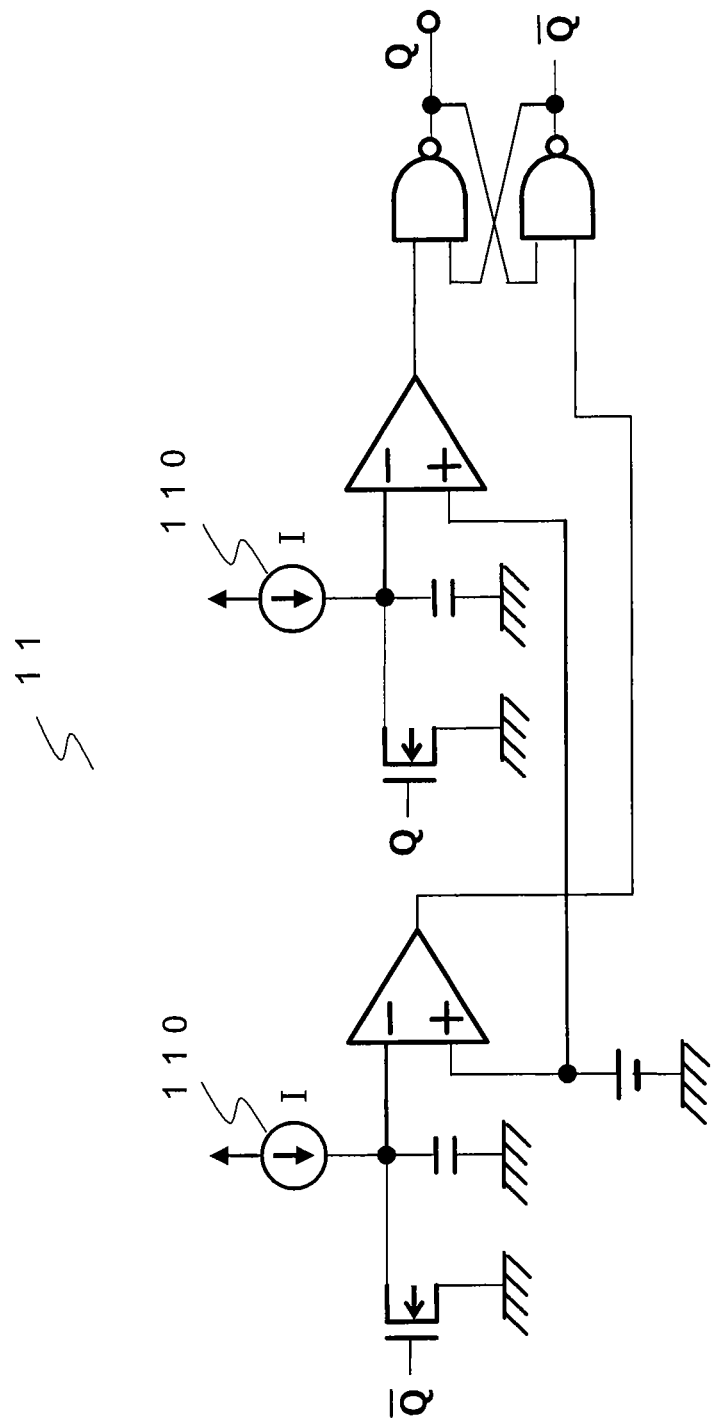
FIG. 2 is a circuit diagram illustrating an example of an oscillation circuit of the temperature detection device according to the embodiment.

FIG. 2 is a circuit diagram illustrating an example of the oscillation circuit 11 of the temperature detection device according to this embodiment.

The method of imparting the positive temperature characteristics to the frequency of the oscillation circuit can be realized by such a well-known manner that, in an oscillation circuit in which a current is caused to flow into a capacitor and whose frequency is determined based on a time period until a predetermined voltage is reached, positive temperature characteristics are imparted to the current. In other words, the method can be realized by imparting positive temperature characteristics to a current I of a current source 110.

Figure 3:
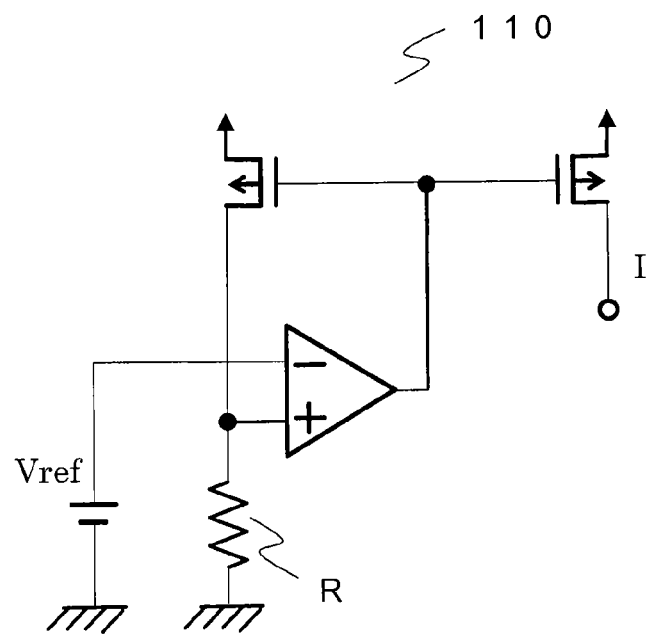
FIGS. 3A and 3B are circuit diagrams illustrating an example of a constant current circuit of the temperature detection device according to the embodiment.
Figure 3:
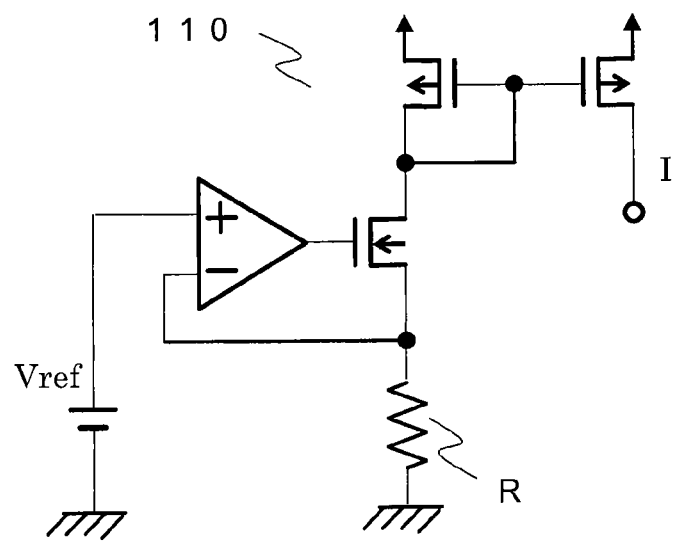

FIGS. 3A and 3B are circuit diagrams illustrating an example of a constant current circuit of the temperature detection device according to this embodiment.

In the current source 110, negative temperature characteristics are imparted to a resistor R, to thereby realize the current I having positive temperature characteristics.

Figure 4:
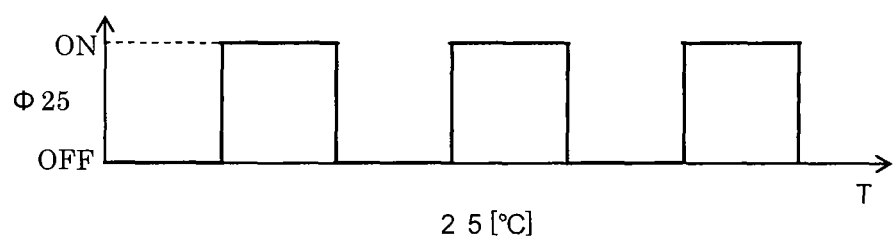
FIG. 4 is a diagram illustrating an example of a control signal $\Phi$ of the temperature detection device according to the embodiment.
Figure 4:
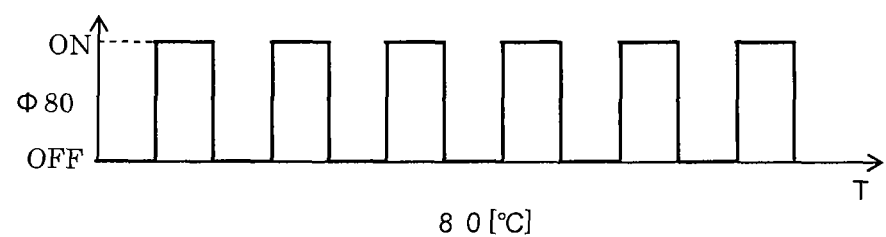

FIG. 4 is a diagram illustrating an example of the control signal Φ of the temperature detection device according to this embodiment. Herein, the temperature to be detected by the temperature detection device is 80° C.

The control signal Φ of L level controls the internal circuits to be in the OFF-controlled state, and the control signal Φ of H level controls the internal circuits to be in the ON-controlled state. As illustrated in FIG. 4, when the temperature is room temperature of 25° C., which is lower than the temperature to be detected by the temperature detection device, the frequency of the oscillation circuit 11 is low and the temperature detection device operates with low current consumption. Then, when the temperature rises and approaches the temperature of 80° C. to be detected by the temperature detection device, the frequency of the oscillation circuit 11 is increased and the temperature detection device operates in a state capable of high-speed response.

Figure 5:
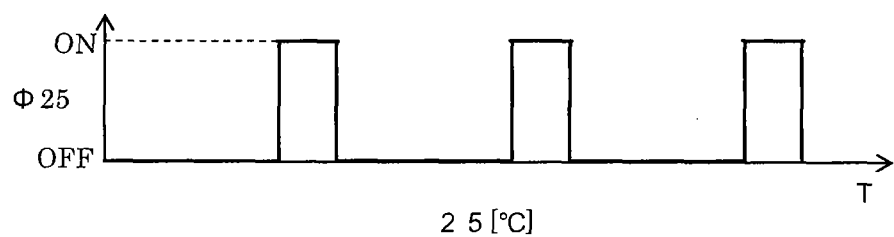
FIG. 5 is a diagram illustrating another example of the control signal $\Phi$ of the temperature detection device according to the embodiment.
Figure 5:
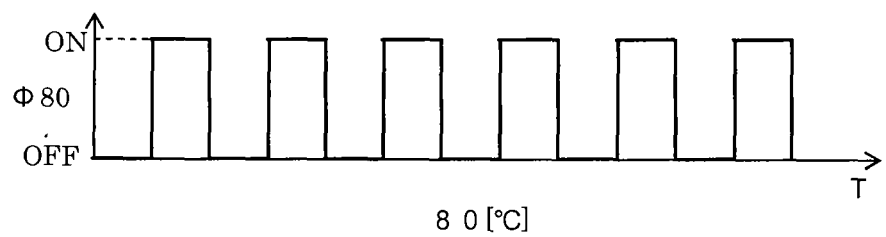
Figure 6:
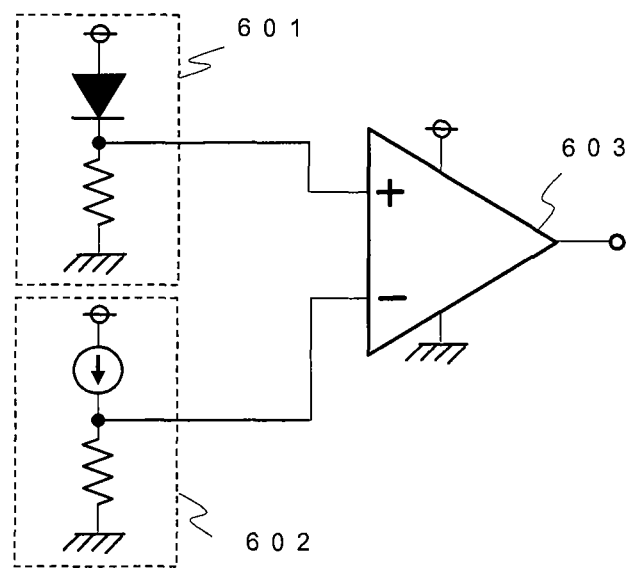
FIG. 6 is a configuration diagram of a conventional temperature detection device.

FIG. 5 is a diagram illustrating another example of the control signal Φ of the temperature detection device according to this embodiment. The control signal Φ illustrated in FIG. 5 is under the same conditions as those of FIG. 4. Note that, in this case aimed at realizing lower current consumption, an ON/OFF duty of the control signal Φ (time ratio between ON-controlled state and OFF-controlled state) is controlled. In the case of FIG. 4, the timing generation circuit 12 is a frequency divider circuit for dividing a frequency of an output signal of the oscillation circuit 11. In the case of FIG. 5, the timing generation circuit 12 further includes a pulse shaping circuit. The pulse shaping circuit is, for example, a one-shot pulse generating circuit. In other words, the timing generation circuit 12 divides the frequency of the output signal of the oscillation circuit 11, and further shapes the waveform into a pulse width that is necessary and sufficient for detecting temperature. Shaping the control signal Φ to such waveform enables the temperature detection device to operate with lower current consumption.

With the above-mentioned configuration, the temperature detection device according to this embodiment realizes low current consumption at a temperature lower than the temperature to be detected, and realizes high-speed response at a temperature around the temperature to be detected. Therefore, a temperature detection device capable of attaining both low current consumption and high-speed response can be provided.

In the temperature detection device according to this embodiment, the temperature sensor 101 is described as a circuit using a diode and a resistor, but is not limited thereto as long as the circuit outputs a voltage corresponding to temperature. For example, the temperature sensor 101 may be a circuit using a bipolar transistor or a thermistor. In the case where the temperature detection device is formed by CMOS, if the temperature sensor 101 is formed by a circuit using a diode or a bipolar transistor, the temperature detection device can be formed as one chip, enabling reduction in size. In the case where the temperature detection device is formed by discrete components, if the temperature sensor 101 is formed by a circuit using a thermistor, the temperature detection device can be formed at low cost.

Further, in this embodiment, the method of reducing the operating currents of the internal circuits is to provide the switch circuit between the power supply voltage and each internal circuit, but is not limited to this form. For example, in the comparator 103, a switch circuit may be provided between gates of transistors forming an internal differential pair and the power supply voltage, or a switch circuit may be provided in an internal current path.

Further, in this embodiment, the method of preventing the invalid output in the OFF-controlled state from being output from the temperature detection device is to provide the sample and hold circuit 104, but is not limited to this form.

Further, in this embodiment, the method of imparting positive temperature characteristics to the frequency of the oscillation circuit 11 is the circuit configuration of FIG. 2, but is not limited to this form.

Further, in this embodiment, the internal circuits to be subject to ON/OFF control are the temperature sensor 101, the reference voltage circuit 102, and the comparator 103, but are not limited to this form. Any internal circuit consuming a current included in the temperature detection device may be subject to the ON/OFF control based on the control signal Φ.

Further, in this embodiment, the temperature detection device is described on the premise of detecting that the temperature has increased. However, particularly in the case of detecting that the temperature has decreased, by imparting negative temperature characteristics to the frequency in the control circuit 10 for controlling ON/OFF of predetermined internal circuits, a temperature detection device capable of attaining both low current consumption and high-speed response can be provided.

As described above, according to the temperature detection device of this embodiment, the OFF-controlled state in which the operating currents of the internal circuits are saved is provided based on a predetermined duty. Accordingly, the operating currents of the internal circuits can be reduced as compared to the case where the internal circuits are always in the ON state. Therefore, a temperature detection device having low current consumption can be provided.

Further, by imparting positive temperature characteristics to the frequency in the control circuit 10 for controlling ON/OFF of predetermined internal circuits, a temperature detection device capable of attaining both low current consumption and high-speed response can be provided.

Still further, particularly in the case of detecting that the temperature has decreased, by imparting negative temperature characteristics to the frequency in the control circuit 10 for controlling ON/OFF of predetermined internal circuits, a temperature detection device capable of attaining both low current consumption and high-speed response can be provided.

What is claimed is:

1. A temperature detection device for detecting temperature, comprising:
    internal circuits including a temperature sensor for outputting a voltage corresponding to temperature, and a comparator for comparing and determining a magnitude relation between an output voltage of the temperature sensor and a reference voltage;
    a control circuit; and
    a sample and hold circuit connected to an output of the comparator,
    wherein the control circuit outputs a control signal for controlling ON/OFF of the internal circuits based on the temperature such that a frequency of the control signal increases as the temperature approaches a predetermined temperature, and
    wherein the sample and hold circuit is configured to hold and output a last output of the comparator output during an ON state of the internal circuits during at least part of an OFF state of the internal circuits.

2. A temperature detection device according to claim 1, wherein:
    the control circuit comprises an oscillation circuit for generating the control signal; and
    the oscillation circuit has a frequency having positive temperature characteristics.

3. A temperature detection device according to claim 2, wherein:
    the oscillation circuit comprises a current source and a capacitor to be charged by the current source; and
    the current source has positive temperature characteristics.

4. A temperature detection device according to claim 3, wherein the current source comprises:
    a reference voltage circuit;
    a resistor having negative temperature characteristics;
    an error amplification circuit for receiving a voltage of the reference voltage circuit and a voltage across the resistor as inputs; and
    a transistor for allowing a current corresponding to an output of the error amplification circuit to flow.

5. A temperature detection device according to claim 1, wherein:
    the control circuit comprises an oscillation circuit for generating the control signal; and
    the oscillation circuit has a frequency having negative temperature characteristics.

6. A temperature detection device according to claim 5, wherein:
    the oscillation circuit comprises a current source and a capacitor to be charged by the current source; and
    the current source has negative temperature characteristics.

7. A temperature detection device according to claim 6, wherein the current source comprises:
    a reference voltage circuit;
    a resistor having positive temperature characteristics;
    an error amplification circuit for receiving a voltage of the reference voltage circuit and a voltage across the resistor as inputs; and
    a transistor for allowing a current corresponding to an output of the error amplification circuit to flow.

* * * * *